United States Patent [19]

Park

[11] Patent Number: 5,186,412

[45] Date of Patent: Feb. 16, 1993

[54] SPOOL BRAKING FORCE SWITCHING DEVICE FOR FISHING REEL

[75] Inventor: Bo K. Park, Busan, Rep. of Korea

[73] Assignee: Silver Star Co., Ltd., Rep. of Korea

[21] Appl. No.: 499,801

[22] Filed: Mar. 27, 1990

[30] Foreign Application Priority Data

Apr. 22, 1989 [KR] Rep. of Korea ............... 4966/1989

[51] Int. Cl.⁵ .......................................... A01K 89/027
[52] U.S. Cl. ..................................... 242/245; 242/243
[58] Field of Search ............... 242/245, 246, 306, 307

[56] References Cited

U.S. PATENT DOCUMENTS

| | | | |
|---|---|---|---|
| 4,572,448 | 2/1986 | Ban | 242/245 |
| 4,746,077 | 5/1988 | Toda | 242/245 |
| 4,830,307 | 5/1989 | Lassi et al. | 242/245 |
| 4,834,307 | 5/1989 | Larsson et al. | 242/245 |

FOREIGN PATENT DOCUMENTS 0150061 7/1985 European Pat. Off. ............ 242/245

*Primary Examiner*—Katherine Matecki
*Attorney, Agent, or Firm*—Ostrolenk, Faber, Gerb & Soffen

[57] ABSTRACT

A spool braking force switching device for fishing constructed such that a clutch switching mechanism enables selectively controlling the rotation of the spool shaft. The spool shaft can be freely rotated in one state while a braking force is exerted to the rotation of the spool shaft in the case winding of the fishline is desired. According to the invention, the construction of the reel can be simplified, mounting space and operating range are reduced, whereby the miniatarizing of the reel can be obtained, designing and manufacturing are easy, and efficiency for disassembling and assembling can be improved.

2 Claims, 4 Drawing Sheets

SPOOL BRAKING FORCE SWITCHING DEVICE FOR FISHING REEL

BACKGROUND OF THE INVENTION

The present invention relates to a spool braking force switching device for a fishing reel, and particularly to an improvement of a spool braking force switching device for a fishing reel in which a clutch switching mechanism capable of selectively controlling the rotation of the spool shaft is mounted at the rear portion of the reel body having front and rear drag mechanisms so that the spool shaft can be rotated smoothly when the fishline is released, while braking force is exerted to the rotation of spool shaft in case of winding up the fishline, thereby enhancing the fishing efficiency.

The spinning reel that is used in general is provided with a drag mechanism capable of controlling the rotation of the spool with frictional resistance.

However, since the drawing resistance of a preadjusted drag mechanism is constantly exerted to the fishline drawn out of the spool, when a fish bites a hook, the fishline can not be smoothly unwound even if a force that a fish pulls is exerted to the fishline. Thus, the fish will sense something different and release the bait instantly. As a result, the efficiency of fishing is extremely reduced.

On the other hand, once the spool is adjusted to be freely rotated to alleviate this problem, the rotation of the spool can not be controlled adequately to pull in a fish caught at the hook, and the drag mechanism should necessarily be controlled again. Thus, the braking force exerted to the spool should be manually switched and controlled by handling the drag mechanism every time in accordance with each condition.

Shown in FIG. 5, a spool braking force switching device of a spinning reel wherein the fishline can be smoothly drawn at the same time and the rotation of the spool can be automatically controlled when rewinding the fishline so that the fish can be hooked speedily and easily, is disclosed in U.S. Pat. No. 4,746,077 to Toda. This device comprises a main gear 3 fixed to a reel body 1 with a shaft 2, contacting means 5 for operating by contacting to a kick plate 4 of said main gear 3, an operating means 8 provided between said contacting means 5 and a lever shaft 7 of handling lever 6; and which operates such that when the kick pin 4 makes said contacting means 5 to operate by the driving of said main gear 3 according to the handling of rotating a handle (not shown), said operating means 8 and interlocking means 9 are cooperatively moved so that the handling lever 6 is returned from the handling position of free rotation of spool to the stop state.

However, since such a conventional spool braking force switching device is made with complicated construction using a large quantity of parts, there has been some disadvantage that cost of parts is increased, and since the parts such as contacting means 5 and operating means 8 are coupled integrally as one assembly, the entire assembly would have to be replaced in the case when one part is damaged. The contacting means 5 is made with a complicated shape formed with an elongated hole 5a inserted into a supporting shaft 11 of fixing member 10, first contacting portion 5b for contacting the kick pin 4, second contacting portion 5c for contacting a push up pin 8b of operating means 8, elongated hole 8a which is made with complicated shape formed with spring receiving means 5d as well as said operating means 8 being coupled to supporting shaft 15 of fixing member 10, and push up pin 8b and defining pin 8c. Thus, there has been a disadvantage that processing of the parts is difficult and precise work is required for manufacturing its metal mold.

Further, in the conventional spool braking force switching device, fixing member 10 occupies a large fixing area. In order to disassemble the main gear 3 in case of repair, the main gear 3 must be disassembled after the fixing member 10, and therefore, efficiency of the assembling and disassembling work of main gear 3 has been reduced.

SUMMARY OF THE INVENTION

Therefore, it is an object of the present invention to provide a spool braking force switching device for a spinning reel in that the above-described problems and disadvantages are solved.

Another object of the present invention is to provide a spool braking force switching device for a spinning reel in which a clutch arm plate is connected to a clutch arm. A kicking disc rotates together with the clutch arm and is connected to a driving gear, whereby said clutch arm is operated while said kicking disc is turning with said driving gear. As a result, the operating position of the spool is switched. The major parts of the device are distributed and arranged within the reel body, thus, the construction is simplified and efficiency of assembling and disassembling is improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
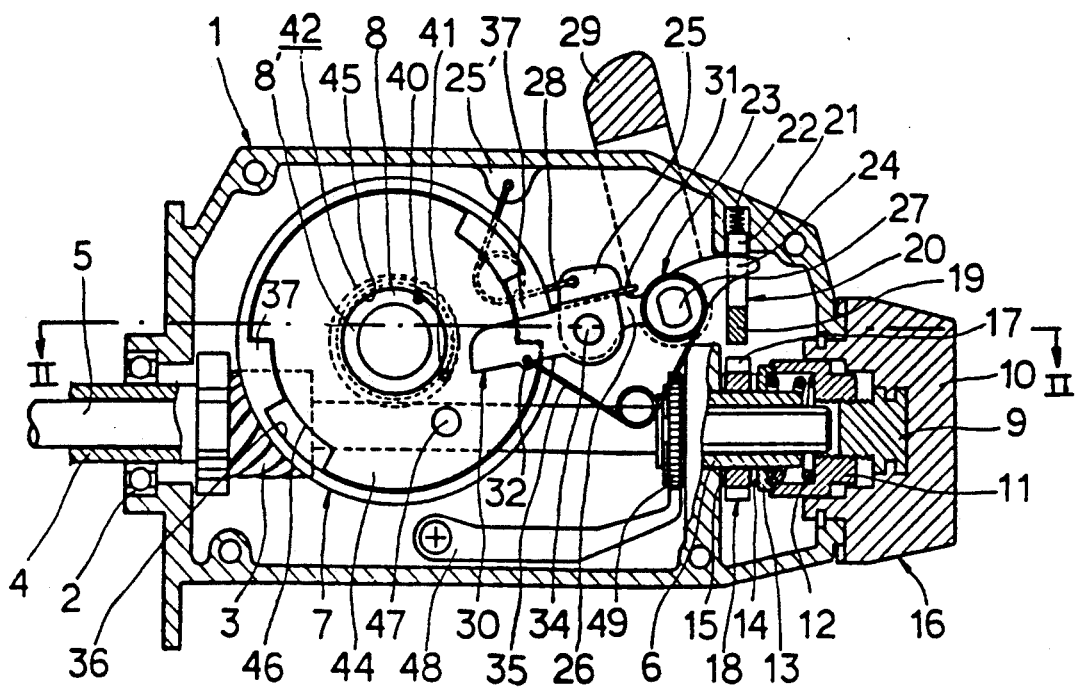
FIG. 1 is a longitudinal cross sectional view illustrating the construction of device of a preferred embodiment of the present invention in a state that braking force is exerted to a spool shaft.

Hereinafter, a preferred embodiment of the present invention will be described in detail with reference to the accompanying drawings.

As shown in FIGS. 1 to 4, a rotor driving shaft 4 having a pinion 3 is rotatably supported via a ball bearing 2 at a front portion of reel body 1, front portion of spool shaft 5 is rotatably and movably supported at the inside of said driving shaft 4, and rear portion of spool shaft 5 is rotatably and movably supported through cylindrical supporting means 6 at the rear portion of the reel body 1. The front portion of spool shaft 5 is rotatably supported within rotor driving shaft 4 and supporting means 6 is fixed to the spool shaft 5 so as to be rotated together with it.

A driving gear 7 meshing with pinion 3 is rotatably mounted at the middle portion of reel body 1. A tensional drag mechanism 16, disposed at the rear portion of the reel body is structured with an adjusting knob 10 having a screw 9 and pressing means 11 coupled with the screw 9 in a screwing manner and being compressed by rotating the adjusting knob 10, a coil spring 12 and plurality of washers 13 and 14.

At the external surface of supporting means 6 located at the internal side of the tensional drag mechanism 16, there is provided a ratchet 18 formed with a plurality of grooves 17. A clutch member 20 having a hooking protrusion 19 is capable of being inserted into the groove 17. The clutch member 20 is urged downward by a compression spring 22 located at its upper end, and switching cam 24 of clutch arm 23 can be inserted into its lower end, above protrusion 19.

Clutch arm 23 is fixed to an arm shaft 27 provided between both side walls of the interior of the reel body 1. A torsion spring 28 is connected to a fixing protrusion 25' of the reel body 1 and a fixing protrusion 25 of said clutch arm 23. A braking switching lever 29 exposed to the exterior of the reel body 1 is fixed to both ends of said arm shaft 27.

In the construction thus formed, an arm plate 30 is rotatably connected by a pivot pin 34 at connecting means 26 of said clutch arm 23 and rotation defining pin 31 formed to said arm plate 30 contacted to the upper side edge portion of connecting means 26 of clutch arm 23, so as not to be rotated clockwise around a pivot pin 34 with the arm plate 30. On end of a torsion spring 35 is connected to a fixing hole 32 of the arm plate 30 and the other end is connected to the arm shaft 27.

Further, an inserting groove 36 of predetermined depth is formed in driving gear 7, and a pair of catching projections 37 are formed at opposite sides of the groove 36. Annular spring inserting groove 38 is formed at around a lower portion of supporting means 8' of the rotary shaft 8 of said driving gear 7, as well as spring fixing groove 39 being formed vertically along supporting means 8' of the rotary shaft 8. A circular torsion spring 42 having vertical hooking pieces 40 and 41 at both ends is inserted into the spring inserting hole 38 of said rotary shaft 8. The vertical hooking member 40 is hooked by inserting it into fixing groove 39, upon which kicking disc 44, having spring fixing hole 43, is coupled such that supporting means 8' of said rotary shaft 8 is inserted into its center hole. Another vertical hooking piece 41 of said torsion spring 42 is inserted into said spring fixing hole 43 thereby being resiliently supported around supporting means 8'. A stop ring 51 is inserted into ring inserting groove 50 formed on the supporting means 8' so as not to be left away with said kicking disc 44.

The kicking disc 44 is formed with catching grooves 46 in which projections 37 of said driving gear 7 are inserted, and a kicking pin 47 contacted with the front portion of said clutch arm 30 is fixed to the upper surface of said kicking disc 44.

In FIG. 1, reference numeral 48 is a click claw made of a leaf spring. Reference numeral 49 represents a click gear fixed to said supporting means 6, and although it is not shown in the drawings, the spool to be wound with the fishline is coupled at the front portion of said spool shaft 5 by the front drag mechanism so that the tightening force can be controlled.

Operation and effect of the present invention thus constructed as above will be described in detail hereinafter.

Figure 2:
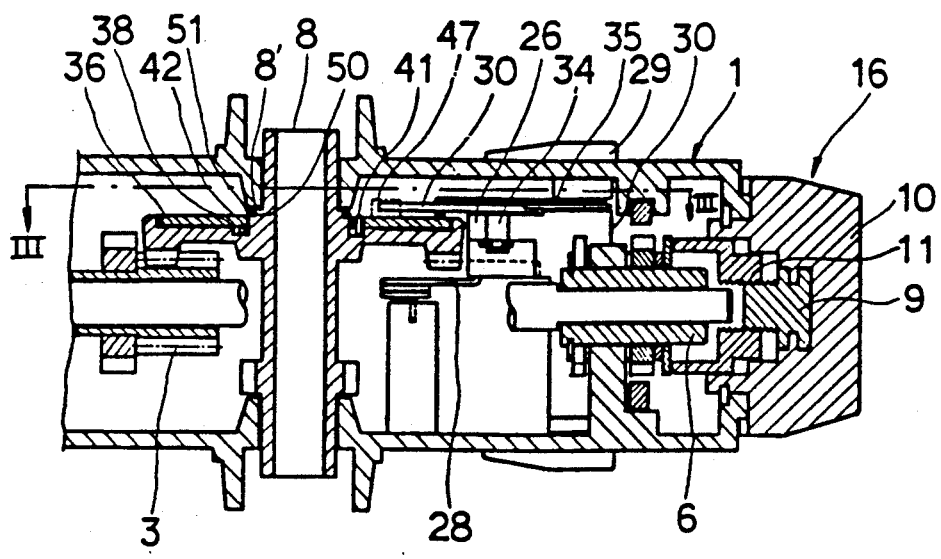
FIG. 2 is a latitudinal cross sectional view of FIG. 1.

FIGS. 1 and 2 illustrate a released state wherein the braking force is not exerted to the spool shaft 5 when pushing the braking force switching lever 29 forwardly such that said tensional drag mechanism 16 and front drag mechanism are pertinently controlled to be matched with kind and characteristic of fish.

At this moment, the switching cam 24 of clutch arm 23 lifts up the hooking pin 21 of said clutch member 20 and, as a result, the hooking protrusion 29 of said clutch member 20 is lifted away from the groove 17 of the ratchet 18, whereby the spool shaft 5 can be freely rotated.

Accordingly, when angling by releasing the fishline in this state, in the case when the fish bites the bait and pulls it, the spool shaft 5 is freely rotated and the fishline is smoothly unwound, and therefore, enabling the fish to swallow the bait and hook without feeling any different sense due to tension of the fishline.

Figure 3A:
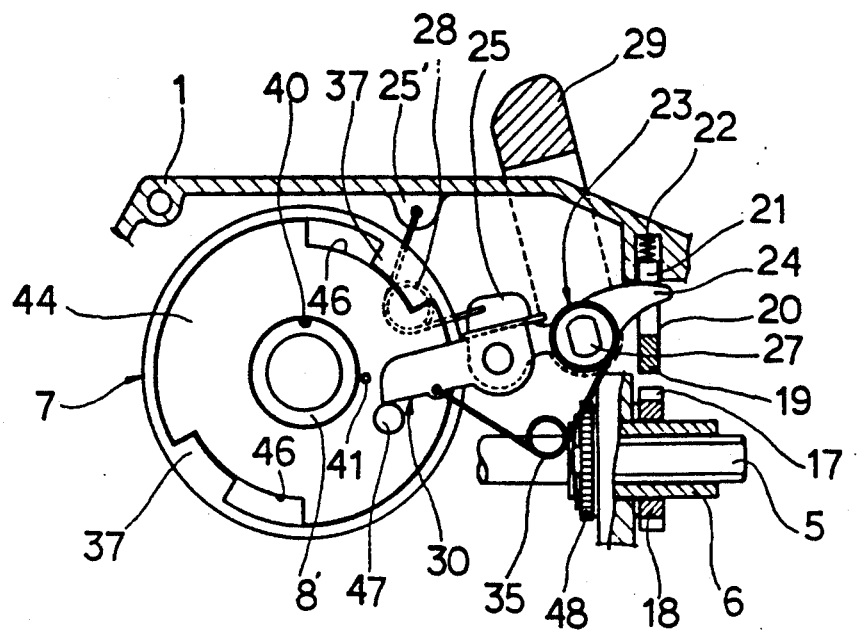
FIGS. 3A to 3C are fragmentary cross sectional views for showing the braking force switching operation of a device of a preferred embodiment of the present invention step by step.
Figure 3B:
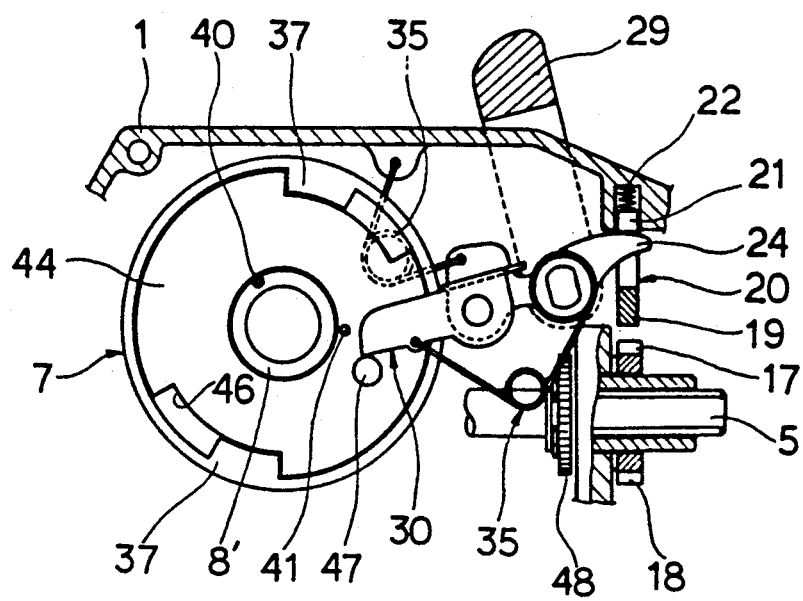
Figure 3C:
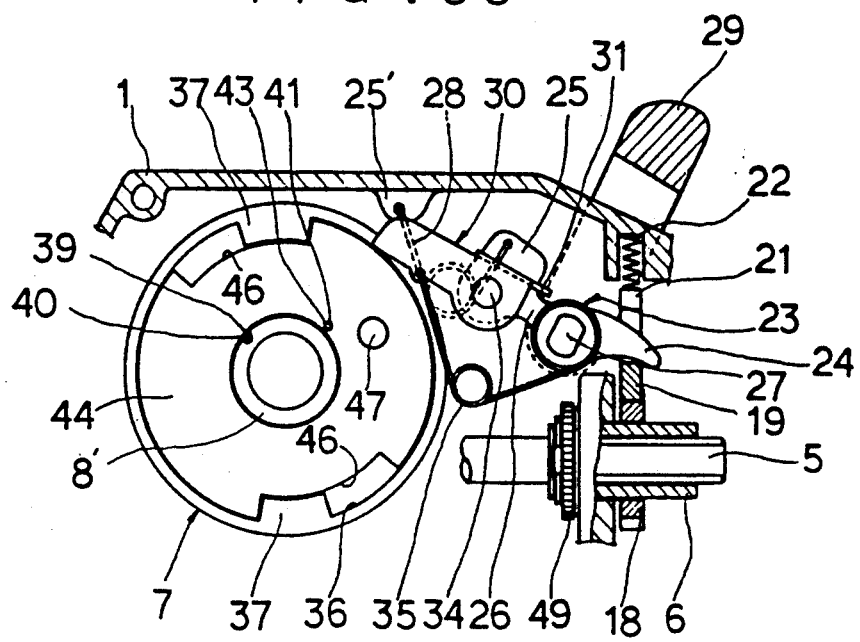

On the other hand, when the fish is hooked and the fishline is drawn out, the click gear 49 provided at the spool shaft 5 is rotated enabling the click claw 48 to operate whereby a predetermined click sound is generated. The released fishline becomes wound by rotating a handle (not shown in the drawings) of the reel coupled to the driving gear 7, wherein when the handle is rotated in this state, the driving gear 7 is rotated counterclockwise and the kicking disc 44 provided at said driving gear 7 is rotated together therewith. When the kicking pin 47, fixed to the kicking disc 44, contacts the arm plate 30, connected to the clutch arm 23 as shown in FIG. 3A, the rotation of kicking disc 44 is stopped. When the driving gear 7 is further rotated, the catching projection 37 of the driving gear 7 contacts the catching groove 46 of the kicking disc 44 as shown in FIG. 3B, and the driving gear 7 and the kicking disc 44 are rotated together. As a result, the kicking pin 47 fixed to the kicking disc 44 pushes the arm plate 30 as much as a predetermined angle and accordingly, the clutch arm 23 connected to said arm plate 30 compresses the torsion spring 28 in a direction of dead point. The clutch arm 23 continues through a predetermined angle until the torsion spring 28 has passed through the dead point. The clutch arm 23 and the brake switching lever 29 are further rapidly rotated together by the operation of its resilient force resulting in the state of FIG. 3C, and thus when the clutch arm 23 is rotated, the switching cam 24 is lowered. As a result, the clutch member 20 is downwardly operated and its hooking protrusion 19 is inserted into the groove 17 of said ratchet 18 thereby braking the rotation of the spool shaft 5.

Thus, the spool shaft 5 can not be rotated when braking is exerted to the ratchet 18 of the spool shaft 5, and accordingly only the braking force by the front draft mechanism is exerted on the front end of the spool shaft 5. Therefore, the rotor is rotated by turning the reel handle and thereby easily hooking a fish caught at the hook.

Although it is explained with regard to the automatic braking operation of the spool shaft 5 by operating the handle in the above description, according to the requirement, braking can be exerted to the rotation of the spool shaft regardless of the operation of the handle, by directly operating the brake switching lever as well.

On the other hand, in case of intending to switch to the released state from the braked state, the brake switching lever 29 is pushed frontwardly, wherein the arm plate 30 rotating together with the brake switching lever 29 and the clutch arm 23 are caught by the kicking pin 47 of the kicking disc 44. The rotation is then stopped together with the handle and the driving gear 7 is stopped at the solid line of FIG. 4. The kicking disc 44, supported by the rotary shaft 8 of the driving gear is resiliently urged counterclockwise by the torsion spring 42, and is pushed by the arm plate 30 and rotated clockwise. As a result, the brake switching lever 29 and the clutch arm 23 are smoothly rotated and the device is moved to the released state of FIG. 1.

At this moment, as described hereinbefore, the hooking protrusion 19 of the clutch member 20 is away from the groove 17 of the ratchet 18 and the spool shaft 5 is free to rotate. The frictional force exerted on the spool shaft 5 is controlled by rotating the tensional drag mechanism 16 so that the spool shaft 5 is allowed to smoothly rotate or rotate with slight resistance.

Figure 4:
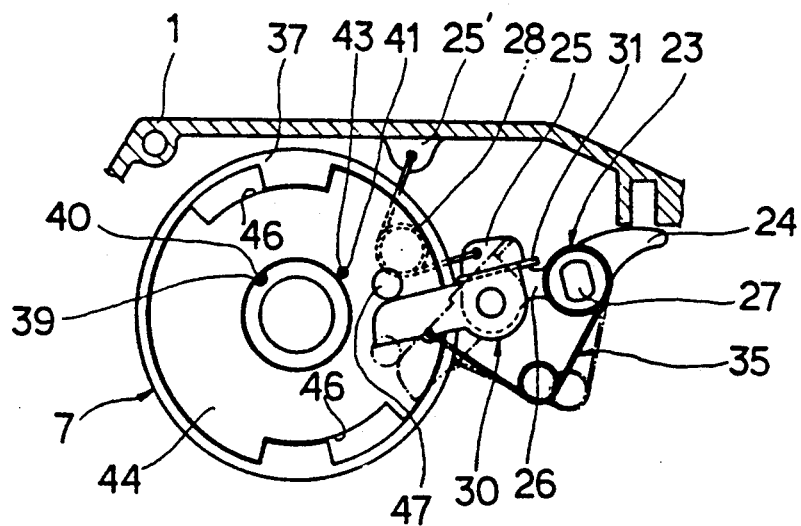
FIG. 4 is a fragmentary cross sectional view for showing the operation in case where the driving gear is reversely turned in a state of the braking force being exerted to the spool shaft of the device of the present invention.
Figure 5:
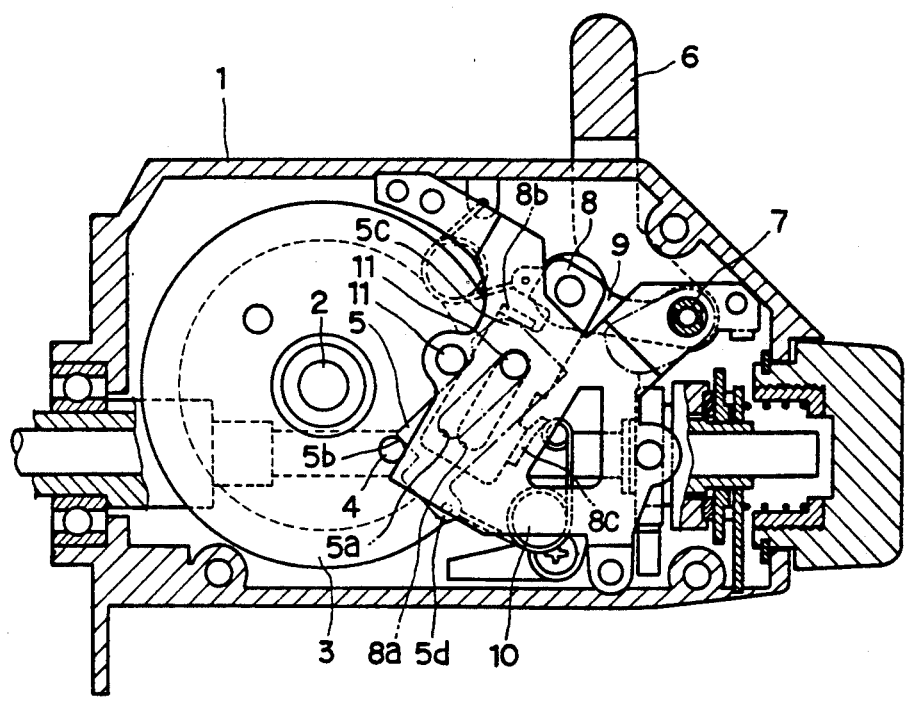
FIG. 5 is a longitudinal cross sectional view of conventional spool braking force switching device.

Further, when the driving gear 7 is reversely rotated clockwise in the released state of FIG. 1, the driving gear 7 and the kicking disc 44 are rotated together as shown in FIG. 4. The kicking pin 47 becomes hooked to the arm plate 30, but since the arm plate 30 is rotatably mounted to the connecting means 26 of the clutch arm 23 by the pin 34, and is resiliently urged by the torsion spring 35, the arm plate 30 is rotated counterclockwise by the kicking pin 47 of the kicking disc 44 in accordance with the rotation of the driving gear 7. Since the counterclockwise force is maintained by the returning resilient force of the torsion spring 35 after the kicking pin 47 has passed therethrough, the reverse rotation of the driving gear 7 can be executed without resistance.

According to the present invention as described above, the arm plate is rotatably mounted to the clutch arm as well as being resiliently urged by the torsion spring. The kicking disc, having the kicking pin, is mounted to the shaft to the driving gear and the handle which is rotated through a simple structure and resiliently urged by the torsion spring. Accordingly, when the driving gear is rotated, said kicking disc and the arm plate are rotated and the clutch arm is rotated whereby the braking state of the spool shaft is automatically released. Therefore the construction of the reel can be simplified, and since major parts, such as the arm plate and the kicking disc, are small and easily constructed, there is an advantage in that the mounting space and operating range are reduced whereby contributing to miniaturizing the reel. Also the designing and manufacturing are easy and the efficiency of disassembling and assembling of reel can be improved.

What is claimed is:

1. A spool braking force switching device for a fishing reel comprising:
   a reel body;
   a driving shaft rotatably disposed in said reel body;
   a spool shaft rotatably and movably supported in said driving shaft;
   a driving gear rotatably mounted on said reel body for rotating said driving shaft, said driving gear having an inserting groove and catching projections disposed on opposite sides thereof and a rotary shaft, said rotary shaft including a spring inserting groove and a spring fixing groove;
   a tension drag mechanism disposed on said reel body for applying a resistance against rotation of said spool shaft;
   a ratchet member coaxially connected to said spool shaft, said ratchet member having a plurality of grooves;
   a clutch member having a hooking projection, wherein said hooking projection engages one of the plurality of grooves of said ratchet member to prevent rotation of said spool shaft;
   an arm shaft disposed in said reel body;
   a clutch arm having a switching cam, said clutch arm and switching cam being fixed to said arm shaft;
   an arm plate connected to said clutch arm, said arm plate, clutch arm, and switching cam being pivotally connected to said reel body, wherein said switching cam engages said clutch member to move said hooking projection in and out of engagement with one of said plurality of grooves of said ratchet member;
   a torsion spring having two ends, one of said ends being attached to said clutch arm, the other of said ends being attached to a protrusion in said reel body, said torsion spring biasing said clutch arm;
   at least one braking switch lever fixed to said arm shaft;
   a circular torsion spring having vertical hooking ends, said circular torsion spring being disposed on said rotary shaft, wherein said hooking ends are inserted into said spring inserting hold and said spring fixing groove on said rotary shaft respectively; and
   a kicking disc fixed on said rotary shaft in connection with one of said vertical hooking ends, said kicking disc having catching grooves, said catching grooves engaging said catching projections upon rotation of said driving gear, said kicking disc having a kicking pin for pushing and rotating said arm plate, wherein said kicking disc is urged in a counterclockwise direction by said circular torsion spring.

2. A spool braking force switching device according to claim 1, wherein when said clutch member is not engaged with said ratchet, said torsion spring biases said clutch arm in a counterclockwise direction and when said clutch member is engaged with said ratchet, said torsion spring biases said clutch arm in a clockwise direction.

* * * * *